United States Patent

[11] 3,609,041

| [72] | Inventors | Robert H. Webb<br>104 Bertwell Road, Lexington, Mass. 2173;<br>Niels O. Young, Old Winter St., Lincoln, Mass. 01773 |
|---|---|---|
| [21] | Appl. No. | 42,729 |
| [22] | Filed | June 2, 1970 |
| [45] | Patented | Sept. 28, 1971 |

[54] LIQUID SAMPLE SPECTRAL SOURCE
27 Claims, 6 Drawing Figs.

[52] U.S. Cl. .................................................. 356/85, 250/226, 313/231
[51] Int. Cl. .................................................. G01j 3/30, G01j 3/34
[50] Field of Search .................................................. 356/85, 86; 250/226; 23/252; 313/231

[56] References Cited
UNITED STATES PATENTS
| 3,520,612 | 7/1970 | Hoffmann | 356/86 |
| 3,550,858 | 12/1970 | Herron et al. | 356/85 |

*Primary Examiner*—Ronald L. Wibert
*Assistant Examiner*—V. P. McGraw
*Attorney*—Schiller & Pandiscio ABSTRACT: A method and device for generating spectral radiation characteristic of a liquid sample. An electrical voltage is applied to a body of conductive liquid, the voltage being in excess of the breakdown voltage of the vapor state of the liquid and causing a current sufficient to raise the temperature of the liquid to cause the liquid to vaporize and form a bubble. The bubble formed is sufficiently restricted so that the potential across the bubble can rise until electrical breakdown and an electrical discharge only across the bubble occurs.

PATENTED SEP 28 1971

ROBERT H. WEBB
NIELS O. YOUNG
INVENTORS.

BY *Schiller & Pandiscio*

ATTORNEYS.

ROBERT H. WEBB
NIELS O. YOUNG
INVENTORS.

BY Schiller & Pandiscio
ATTORNEYS.

ROBERT H. WEBB
NIELS O. YOUNG
INVENTORS.

BY *Schiller & Pandiscio*

ATTORNEYS.

LIQUID SAMPLE SPECTRAL SOURCE

The present invention relates to a method and device for generating spectral radiation characteristic of a liquid sample and more particularly to a new and improved method and device for providing a liquid sample spectral source for use in spectrometry and photometry. Flame photometry and spectroscopy may be used to assay atomic constituents in a liquid sample by detecting spectral radiation in the form of spectral lines which are characteristic of the liquid sample.

Most prior art spectral sources used in spectrometry and photometry have been either of the arc of spark type source or a flame source as used in flame photometry including the fact that they destroy the sample. These types of spectral sources have many disadvantages. In an arc or spark type of spectral source, a pair of metal or semimetal electrodes are used to create an arc or spark between them. Such sources suffer from great wear on the electrodes due to the arcing and the electric environment contributes spurious signals to the detected spectral lines. Also arc sources are unstable and difficult to control by electrical feedback means and injection of the liquid sample is quite difficult. The metal or semimetal electrodes are also a source of contamination so that the detected spectrum is very rich in lines from the electrodes.

In a flame type of spectral source, the liquid chemical sample is pumped into an atomizer which is used to spray liquid droplets into a burning flame which is supplied from a source of gas such as a gas cylinder attached to a burner. The flame is thus fueled separately from the liquid chemical. Such flame spectral sources suffer from the following disadvantages: (1) The flames are relatively large and require ventilation, fuel, such as from gas cylinders, and ancillary supporting systems, such as atomizers or aspirators which are highly subject to clogging, particularly when the liquid contains proteins. (2) Depending on the fuel used, for example hydrogen, the flame photometer may be extremely dangerous because of the possibility of accidental explosions. (3) In addition, the temperature of the flame is affected by the addition of the liquid chemical. (4) The heat generated by a flame restricts the proximity within which the required optics of the photometry system may be placed with respect to the flame, since the mirrors and lenses are subject to cracking and physical damage. This reduces light collection efficiency. (5) Flames also have a tendency to create anion interference by formation of nonvolatile salts resulting from evaporating the atomized droplets by thermal radiation. (6) Another problem is that most flames have an inner cone at a different temperature, which is another serious source of spectral variability. (7) Also, a flame is very sensitive to ambient conditions such as smoking, coughing, and other spurious sources of contamination in the surrounding atmosphere. (8) AC coupling flame sources to electronic detectors also requires the use of choppers or attenuators which take 50 percent or more of the radiated energy. (9) Flame sources are very difficult to control by electrical feedback means. (10) Finally, because of the gas cylinders usually required for the flame, most flame spectral sources are not easily transportable.

Therefore, an object of the present invention is to provide a method and device for providing a liquid sample spectral source which overcomes the disadvantages of prior art spectral sources. Another object of the present invention is to provide a liquid sample spectral source which is flameless and does not subject metal electrodes to severe arcing wear. Another object of the present invention is to provide a liquid sample spectral source which provides an electrical discharge from one liquid surface to another liquid surface, not an arc between metal of semimetal electrodes. Still another object of the present invention is to provide a liquid sample spectral source which is not sensitive to ambient conditions in the room such as might result from smoking, coughing, dust, particles of paint of plaster and other contaminants in the room's atmosphere. Yet another object of the present invention is to provide a liquid sample spectral source which does not use a combustible gas, or gas burners, which is extremely safe and simple to use, which is not subject to accidental explosion and which automatically ceases operation when the liquid stages fluorine or becomes nonconductive. Another object of the present invention is to provide a liquid sample spectral source which may be enclosed, does not require any mirrors or lenses with the optics used therewith and which may have the optics placed in very close proximity thereto without any fear of damage to the optics. Still another object of the present invention is to provide a liquid sample spectral source which is free of anion interference resulting from the formation of nonvolatile salts and which has a self-cleaning feature in that it may be periodically flushed with a nonconductive liquid. Yet another object of the present invention is the provision of a liquid sample spectral source which has a much better signal-to-noise ratio as compared to prior art sources and which eliminates the need for choppers or attenuators. Another object of the present invention is to provide a source easily controlled by electrical feedback means. A further object of the present invention is to provide a source in which the liquid sample is substantially recovered intact. Another object of the present invention is to provide a liquid sample spectral source which is easily transported.

The above objects, advantages and features of the present invention, as well as others, are accomplished in the method of the present invention by providing a method for generating spectral radiation characteristic of a liquid sample. The method comprises the following steps. An electrical voltage is applied to a body of conductive liquid, the voltage being in excess of the breakdown voltage of the vapor state of the liquid and a current sufficient to raise the temperature of the liquid to cause the liquid to vaporize and form a bubble. The bubble formed is sufficiently restricted so that the potential across the bubble can rise until electrical breakdown and an electrical discharge only across the bubble occurs.

The objects, advantages and features of the present invention, as well as others, are accomplished in the device of the present invention by providing a device for generating spectral radiation characteristic of a liquid sample. The device comprises a conduit means through which a conductive liquid sample is intended to flow. A pair of terminals formed of material which is substantially chemically inert to the constituents of the liquid in ionized and un-ionized states are provided. The terminals are at least partially immersed in the liquid flow. Means are provided for applying a potential across the terminals in excess of the breakdown voltage of the vapor state of the liquid and at a current level adequate to raise the temperature of the liquid sample between the terminals to a level at which the liquid sample vaporizes and forms a bubble. Means are provided for restricting the bubble sufficiently in space such that the bubble does not simultaneously contact both of the terminals, whereby the potential across the bubble can cause electrical breakdown in the vapor and an electrical discharge across the bubble occurs.

Other objects of the invention will in part be obvious and will in part appear hereinafter. The invention accordingly comprises the processes involving the several steps and the relation and order of one or more of such steps with respect to each of the others, and the devices possessing the features, properties and relations of elements which are exemplified in the following detailed disclosure and the scope of the application all of which will be indicated in the claims.

For a fuller understanding of the nature and objects of the present invention, reference should be had to the following detailed description taken in connection with the accompanying drawings wherein.

Figure 1:
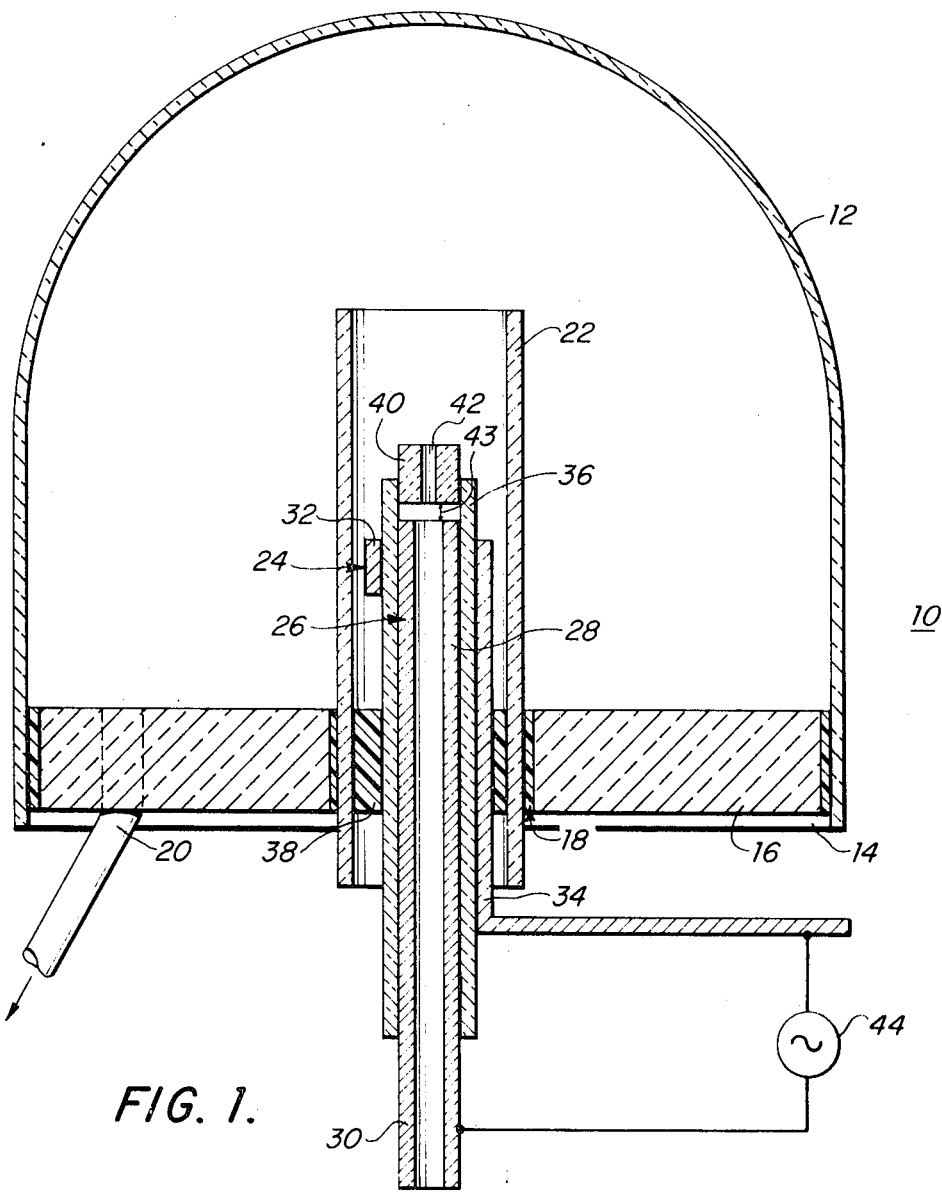
FIG. 1 shows one embodiment of the present invention.

FIG. 1 illustrates a device 10 for generating spectral radiation characteristic of a liquid sample. Device 10 includes a housing 12 which is open at one end 14 thereof. Preferably housing 12 is made of a translucent material, such as clear glass, which material is substantially chemically inert to the constituents of the liquid sample in either ionized or un-ionized state. Open end 14 is closed and sealed with a stopper 16 which may be made of silicon rubber or any other insulating material which is nonchemically reactive with the liquid sample. Stopper 16 has two openings 18 and 20 passing completely therethrough. Opening 18 serves to permit introduction of the liquid sample into the housing and for inserting various members to be described into the housing. Opening 20 serves as a rent and drain out of the housing for condensate and any gas and other products which may be formed.

Inserted through opening 18 and projecting at least partially into the housing 12 is a hollow, cylindrical tube 22 which is made of a material which is reasonably high temperature resistant and chemically inert to the constituents of the liquid sample in either its ionized or un-ionized state. Quartz, for example, may be used for the tube 22. Positioned at least partially within tube 22 inside housing 12 and partially extending outside housing 12 are a pair of electrically conductive terminals 24 and 26. Terminal 26 is a hollow, cylindrical tube open at both ends. Terminal 26 has a portion 28, which is positioned inside housing 12 within tube 22, and a portion 30 which extends outside of housing 12. Terminal 24 has a hollow, cylindrical portion 32 open at both ends which has a greater inner diameter than the inner diameter of terminal 26 and which portion 32 is concentric with at least a part of portion 28 of terminal 26. Terminal 24 has another portion 34 which extends from cylindrical portion 32 out of the housing 12. Terminals 24 and 26 are made of refractory metals which must be chemically inert to the constituents of the liquid sample in either its ionized or un-ionized state. Any of the refractory metals including tantalum, tungsten, molybdenum, and niobium may be used for terminals 24 and 26. Platinum, a noble metal, has also been found to work and it is possible that other metals or semimetals such as graphite, could be used for the terminals. By "chemically inert" is meant materials (1) which are nonreactive chemically, such as the gold and platinum, (2) which are passivated by oxide layers, such as aluminum, titanium, tungsten, tantalum, and molybdenum or (3) which are ablative such as zinc and magnesium. The only restrictions are that no precipitates such as $FE_2O_3$ should be injected into the discharge as a result of chemical reaction or electrochemical erosion of the terminals and that no spectral lines which might interfere with the lines to be measured should appear. An example of such interfering lines would be magnesium lines occuring when sodium is to be measured. Ablative electrodes are not quite as desirable because of their shorter life.

A hollow, cylindrical insulating tube 36 partially extending into housing 12 and partially extending outside of housing 12 is positioned concentrically between terminal 26 and the cylindrical portion 32 of terminal 24. Insulating tube 36 fits snugly against terminal 26 and may be made of any insulating material which is chemically inert to the constituents of the liquid sample in either its ionized or un-ionized state. For example, tube 36 may be made of Silastic rubber. Tubes 22 and 36 and terminals 24 and 26 are all held in position adjacent opening 18 by a sealing material 38 which fills the spaces between opening 18 defined by stopper 16 and tube 22, and between tube 22 and tube 36. Sealing material 38 may be any one of a number of well known sealing materials such as silicone rubber, sealing wax, epoxy or any other sealing material which is reasonably temperature resistant and is chemically inert to the constituents of the liquid in either its ionized or un-ionized state.

Positioned between the inner walls of tube 22 and snugly gripped by the end of tube 36 and adjacent but spaced from the opening adjacent portion 28 of terminal 26 is a restriction means in the form of a tube 40 having an opening 42 passing completely therethrough. Opening 42 of tube 40 is directly aligned with the opening in terminal 26. There is a gap 43 between the end of portion 28 of terminal 26 and tube 40 which must be maintained as will later be described. The inner diameter of the opening in tube 40 is less than the inner diameter of hollow tube 36. Tube 40 must be reasonably high temperature resistant and must be chemically inert to the constituents of the liquid in either their ionized or un-ionized state. Tube 40 may be made of such materials as alumina, quartz, ceramic or sapphire.

Figure 2:
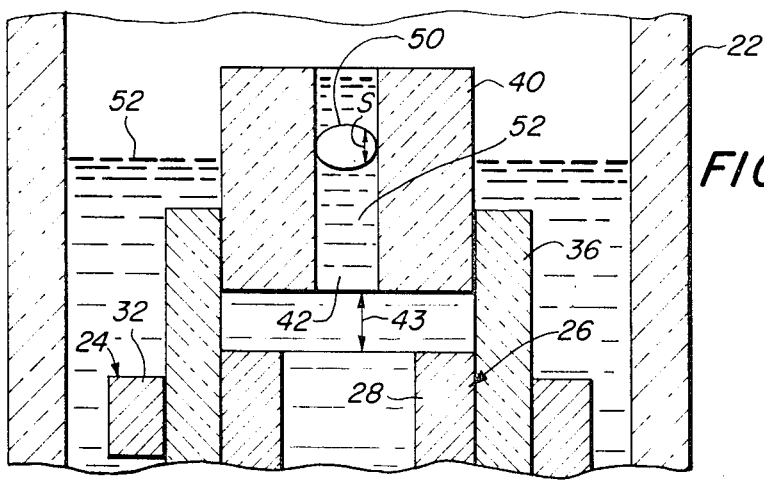
FIG. 2 shows an enlarged portion of one of the elements in FIG. 1.

A source 44 of electrical current is connected across portion 34 or terminal 24 and portion 30 of terminal 26 outside housing 12. Source 44 must be capable of supplying an electrical current being at a high AC potential in excess of the breakdown voltage of the vapor state of the liquid sample and at a current level adequate to raise the temperature of the liquid sample between the terminals to a level at which the liquid vaporizes and forms a bubble which is restricted by opening 42 of tube 40 as will be explained later. The frequency of the potential must be sufficiently high to reduce electrolytic formation of gas and to couple through dielectric layers which may inadvertently form on the electrodes. By "breakdown voltage of the vapor" is meant the breakdown voltage of the vapor across a distance defined by the gap formed by a bubble sufficiently large in size to interrupt the electrical current flow. This relationship can be understood from FIG. 2 which shows a bubble 50 in a liquid sample 52, the bubble being restricted in opening 42 of tube 40. The relationship can be expressed as follows:

$$V_{min} \geq S \cdot E_{bd} \qquad (1)$$

whereby $V_{min}$ is the minimum voltage applied by the high-voltage source across the terminals, $S$ is the minimum distance defined by the gap across the bubble 50 sufficient to interrupt the electrical current flow, and $E_{bd}$ is the breakdown field for the vapor state of liquid 52. It should also be noted that gap 43 must be maintained and it must be sufficiently large to isolate the bubble 50 as it is formed so that no part of the bubble contacts or touches terminal 26.

The liquid sample is introduced into the chamber defined by the walls of tube 22 inside housing 12 by pumping the liquid through the open end of terminal 26 which is outside of housing 12. The liquid may be made to flow into housing 12 through terminal 26 by gravity flow, a peristaltic pump, a syringe pump or any other such similar pump, none of which are shown because the pump forms no part of the present invention. Whatever type of pumping action which is employed, it must not be such as to permit adventitious contamination of the liquid sample.

In the preferred version of the present invention tubes 22, 36, and 40, as well as housing 12, must be made of a translucent material in order that all the spectral radiation can readily be detected by the spectrometry or photometry equipment with which the device 10 is used. However, it is conceivable that the spectral radiation detectors may be placed within housing 12 immediately adjacent the restriction formed by opening 42 in tube 40 so that only tube 40 need be made of a translucent material. It is also possible that tube 40 a transparent, not a translucent, material, if imaging detectors are desirable.

As for the shape, size and position of the tubes, terminals and the restricted opening there are certain relationships which must be maintained in each of the embodiments of the invention. First, and most importantly, the bubble formed must be sufficiently restricted in space such that the bubble does not simultaneously contact both of the terminals during discharge. Secondly, there must be a narrowing of the flow of liquid sample, thereby creating a restriction in which a bubble may be formed and confined while liquid sample is flowing. Also, the bubble formed must be sufficiently restricted in time such that an electrical discharge takes place across the bubble.

More specifically with respect to the embodiment shown in FIG. 1, as the liquid begins to vaporize, a bubble formed must be restricted in size and position, time and space. With respect to size and position the inner diameter of the opening 42 in tube 40 must be less than the inner diameter of the opening in tube 36. That is $$D_{42} < D_{36} \quad (2)$$

where $D_{42}$ is the inner diameter across opening 42 and $D_{36}$ is the diameter of the cross-sectional opening in tube 36. Opening 42 must be such that when the liquid sample begins to vaporize a single bubble will have at least one dimension which is greater than the inner diameter of opening 42 so that the bubble will close the space across the inner diameter of opening 42. That is $$d_{\text{bubble}} \geqslant D_{42} \quad (3)$$

where $d_{\text{bubble}}$ is the minimal cross-sectional dimension through the center of the bubble and $D_{42}$ is the inner diameter across opening 42. The greater the inner diameter of opening 42, the higher the operating current of the device. Also the size and configuration of opening 42 control the position and stability of the electrical discharge which occurs across the bubble as will be described in conjunction with the operation of device 10. That is, the bubble must be restricted with respect to time. The bubble must be confined in opening 42 for a sufficiently long time to permit an electrical discharge to form thereacross. The bubble must also be restricted in space such that the greatest cross-sectional dimension of the bubble in a line substantially perpendicular to the lines of equipotential force between the two terminals 24 and 26 cannot equal or exceed the minimum distance between the two terminals measured along the lines of electrical current flow. That is $$D_{\text{bubble}} \not\equiv K \quad (4)$$

where $D_{\text{bubble}}$ is the greatest cross-sectional dimension of the bubble in a line substantially perpendicular to the lines of equipotential force between the two terminals and $K$ is the minimum distance between the two terminals measured along the lines of electrical current flow. Also, the bubble must be so restricted in space that it cannot simultaneously contact or touch both terminals 24 and 26 or arcing between the terminals may occur.

In the operation of the device 10 shown in FIG. 1 a conductive liquid is pumped into housing 12 through the opening in hollow terminal 26. The liquid sample used may be any already conductive liquid on any nonconductive liquid to which ions may be added. Even water with an additive to render it conductive may be employed as the liquid sample. Source 44 applies a high potential as defined in equation (1) to terminals 24 and 26. This potential is in excess of the breakdown voltage of the vaporous state of the liquid sample across a distance defined by the gas formed by a bubble sufficiently large in size to interrupt the flow of electrical current and at a current level adequate to raise the temperature of the liquid sample between the terminals to a level at which the liquid sample vaporizes and forms such a bubble. As the liquid is pumped into housing 12 through terminal 26, it overflows terminals 24 and 26 and tubes 36 and 40 partially filling the chamber defined by tube 22. As terminals 24 and 26 become immersed by the liquid, the electrical circuit between the terminals is completed. The liquid level between tubes 36 and 22 is somewhat lower than the level of the liquid inside tube 36 adjacent tube 40 and the end of portion 28 of terminal 26. However, this relationship of the different liquid levels is not critical to the operation of the device.

The electrical current applied to terminals 24 and 26 begins to heat the liquid. The liquid first begins to vaporize near the restriction defined by opening 42 of tube 40 adjacent the end of portion 28 of terminal 26. As the liquid begins to vaporize, a bubble is formed and is confined by opening 42. The bubble formed is restricted in size and position and space as defined in equations (2), (3) and (4) previously mentioned. Preferably, the bubble never touches terminal 26 but the discharge may still occur from one liquid surface of the bubble to the liquid surface of the bubble which may be in contact with terminal 26. The bubble is also restricted within opening 42 in time for a sufficient period to cause interruption of the current flow between terminals 24 and 26. The potential across the bubble rises to cause electrical breakdown in the vapor and an electrical discharge across the bubble from one liquid surface to another occurs. As the discharge occurs, the detectors (not shown) detect the spectral lines resulting from the discharge. When the discharge occurs, most of the vapor is distilled out of the discharge and passes out of or is ejected as a vapor jet from opening 42 where it condenses on the walls of glass housing 12 and runs down to be drained off through opening 20. Opening 42 is then refilled with liquid and the process begins again. The bubble occur at a relatively high rate—a few 100 to several thousand per second—which rate depends on the electrical parameters and materials used for the tubes, terminals and liquid. Because the electrical discharge is confined by opening 42 to occur across a small bubble from one liquid surface to another, the operating temperature of the discharge and hence ionization and the current density across the discharge are relatively low as compared to prior art arc sources where arcing occurs between the metal or semimetal electrodes. This relatively low operating temperature greatly reduces multiple ionization and the principal spectral line detected is that of the liquid. Also, since the discharge is confined within housing 12, ambient conditions such as smoking, coughing, and other possible contaminants in the surrounding atmosphere do not affect the results.

Tube 22 maintains the liquid in the chamber defined by its inner walls. The level of the liquid with respect to tube 40 and opening 42 therein effects the liquid's temperature and the positional level at which boiling occurs. Boiling is controlled by the rate of heat loss from the liquid which is in turn controlled by the level of liquid standing inside tube 22 and by the amount of vapor ejected from opening 42 of tube 40 when the discharge occurs. The relative height of tube 22 and tube 40 with respect to the open end of portion 28 of terminal 26, may be changed to control this heat exchange. If the height of tube 22 were moved down, boiling would occur at a lower positional level of the liquid and the heat is then lost primarily through the jet of vapor ejected from opening 42 after discharge occurs rather than through the standing liquid. On the other hand if the height of tube 22 were moved upward so that the liquid level reaches almost to the top of tube 40, boiling may occur but a discharge might not take place. The standing liquid must be at a level within tube 22 which is high enough to permit the bubble to be formed in the restriction defined by opening 42. The level of the liquid cannot be so low so that the bubble is prevented from being formed in opening 42, and the level cannot be so high that the vapor jet created by the discharge cannot break through the standing level of the liquid.

In an operative embodiment of the present invention as shown in FIG. 1 which has been tested, the following parameters and materials were employed. Housing 12 was made of clear glass and stopper 16 was made of Silastic rubber. Tube 22 was made of translucent quartz; tube 36 was made of translucent Silastic rubber; terminals 24 and 26 were made of tantalum; and tube 40 was made of translucent polycrystalline alumina. Alumina is a refractory material which can be used up to 1800° C. without degradation. It has high heat conductivity, is a chemically stable insulator and is nonconductive electrically. The inner diameter of the opening of terminal 26 was approximately 0.050 inches. Insulator tube 36 had an inner diameter greater than the 0.050 inch inner diameter of terminal 26 and extended approximately 0.100 inches beyond the end of portion 28 of terminal 26. Tube 40 was located between the walls of tube 36 with opening 42 directly adjacent and slightly spaced from the open end of terminal 26. The inner diameter of opening 42 was approximately 0.015 inches, and the length thereof may vary from approximately 0.050 to 0.500 inches. The voltage applied from source 44 to terminals 24 and 26 was in the form of an approximately 3500 volt peak-to-peak square wave at a frequency of approximately 6 kHz. and a power of approximately 20 watts. The liquid sample used was distilled water with sodium, potassium, or other alkali salts used to form an electrolyte. The brightness of the characteristic spectral lines from the sodium and potassium is for example to be measured. In some cases protein was added to the solution in the form of a gelatin or dilute blood serum. Such solutions as HCl or $NH_4OH$ could also be used to provide the necessary conductivity without contributing spectral emission at the characteristic wavelength whose brightness is to be measured.

Figure 3:
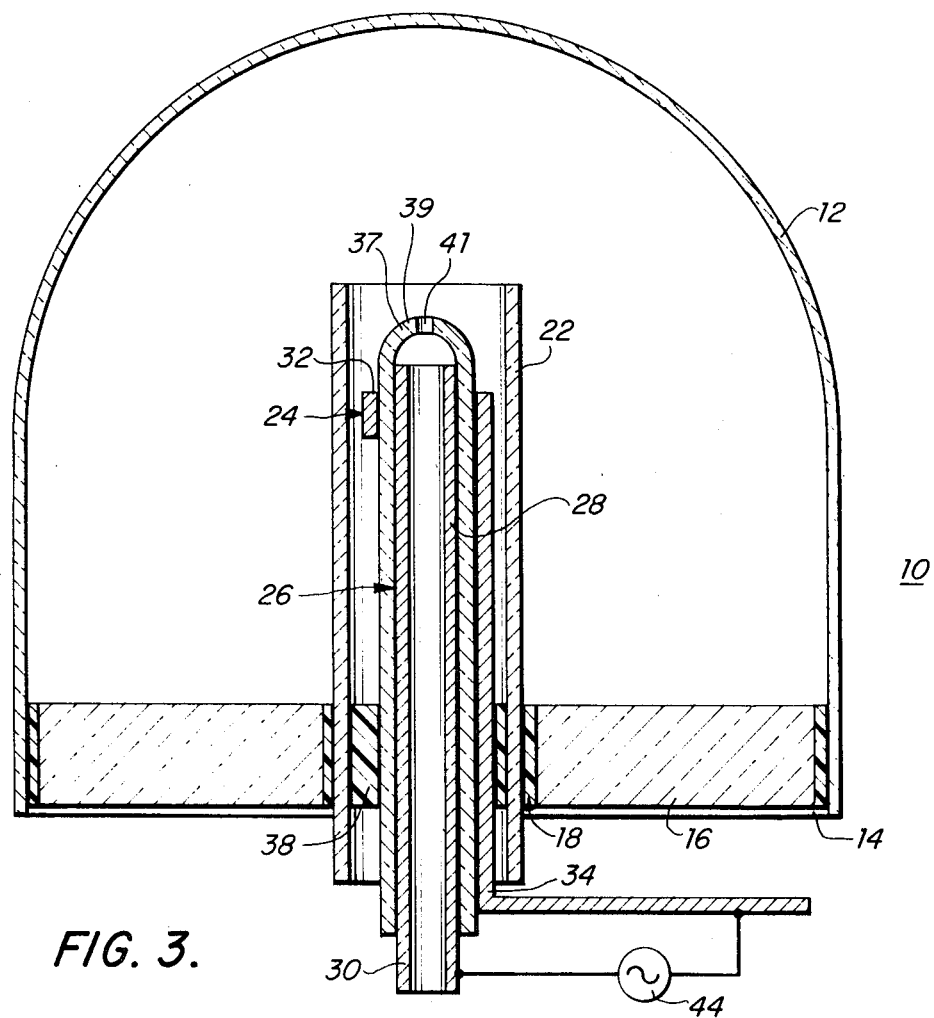
FIG. 3 shows an alternative embodiment of the present invention.

FIG. 3 shows a slightly different embodiment of the device 10 shown in FIG. 1. The only difference between these embodiments is that instead of employing two separate tubes 36 and 40 as in FIG. 1, a single tube 37 is used. Tube 37 is a hollow substantially cylindrical tube, completely open at one end to permit insertion of terminal 26 between the walls thereof and substantially closed at end 39 thereof except for opening 41. The material of which tube 37 is made is translucent, relatively high temperature resistant, and chemically inert to the liquid sample in either its ionized or un-ionized state. Tube 37 may for example, be made of alumina or quartz. Tube 37 provides the same functions as insulator tube 36 and tube 40 in the embodiment of FIG. 1. Opening 41 serves to restrict the bubble in size and position, time and space in the same manner as described with respect to opening 42 in FIG. 1. The operation and constraints of equations (1), (2), (3) and (4) of the embodiment shown in FIG. 1 are the same with respect to that described in FIG. 3.

Figure 4:
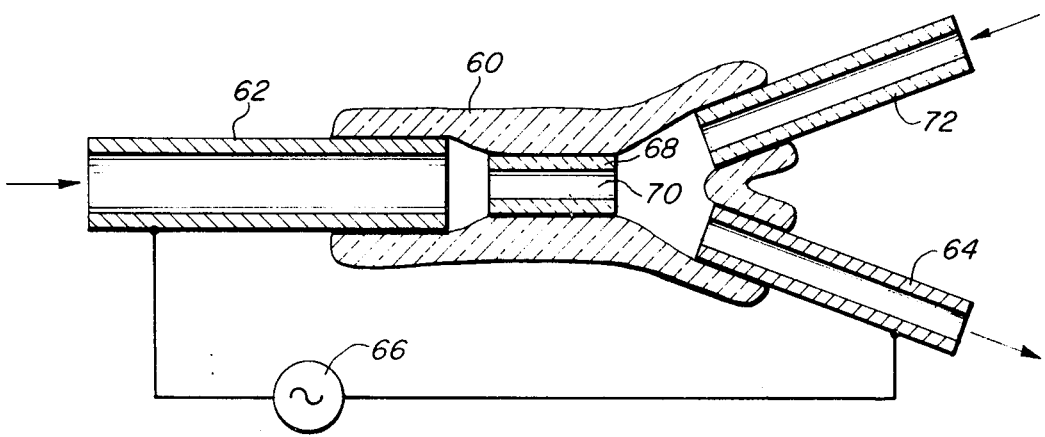
FIG. 4 shows still another embodiment of the present invention.

In the embodiment of the invention shown in FIG. 4 instead of a glass housing, a translucent, hollow insulating sleeve or envelope 60, for example made of glass, is used to hold the liquid. A hollow cylindrical, tantalum terminal 62 is provided for introducing the liquid sample into sleeve 60. Sleeve 60 forms a seal at one end around terminal 62. At the opposite end of member 60 a second hollow, cylindrical tantalum terminal 64 has a portion projecting within and sealed by sleeve 60. A source 66 of AC high voltage is connected across terminals 62 and 64. Terminal 64 being hollow also serves as a drain for the condensed vapor resulting after the electrical discharge occurs across a bubble. The necessary restriction of the bubble is provided by a translucent alumina tube 68 having a small opening 70 passing therethrough. Tube 68 is firmly held in position by sleeve 60 being sealed to it so that liquid can only flow through opening 70 and not around tube 68. Opening 70 positioned directly adjacent and spaced a short distance from the opening in terminal 62 through which the liquid sample flows into the sleeve 60. Also positioned partially within and sealed by sleeve 60 adjacent the end at which terminal 64 is located is a hollow, cylindrical tube 72. Tube 72 is used for introducing a coolant, such s for example HCl or a second stream of the sample liquid. In this embodiment the vapor state of the liquid sample resulting from the electrical discharge occuring in opening 70 is condensed in contact with the coolant and drained off through terminal 64. The operation of the embodiment in FIG. 4 is creating an electrical discharge across a bubble in substantially the same as with respect to the embodiments of FIGS. 1 and 3. The restraints in size and position, time and space which must be placed on a bubble are the same as those given in equations (1), (2), (3) and (4) heretofore mentioned. The main difference in this embodiment is the introduction of the coolant to effect the heat removal and the provision of nonconcentric terminals positioned at opposite ends of the sleeve 60.

Figure 5:
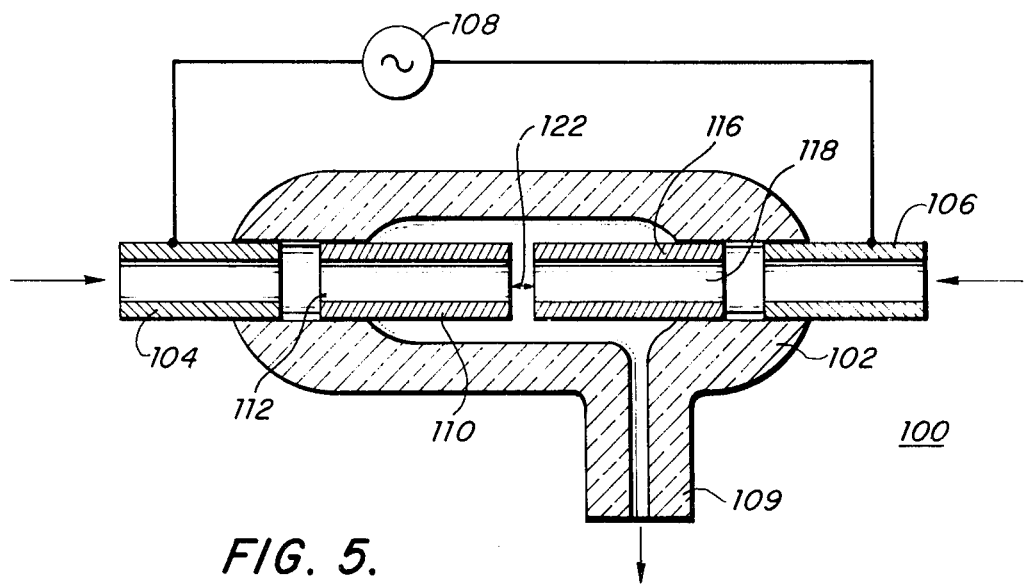
FIG. 5 illustrates another embodiment of the present inventions.

FIG. 5 shows a liquid sample spectral source 100 having a glass sleeve or envelope 102. A liquid sample is introduced into sleeve 102 through a hollow, tantalum terminal 104. A second hollow tantalum terminal 106 is provided through which liquid may be introduced into sleeve 102. Terminals 104 and 106 are held in position by sleeve 102 which also acts to seal the liquid from escaping from around the terminals. This liquid acts as a coolant and may be the same as the liquid sample introduced through terminal 104 or may be another liquid such as for example $NH_4Cl$, $NH_4OH$, HCl, $N(CH_3)_4OH$ in a water solution. A source of high potential 108 is connected across terminals 104 and 106. Sleeve 102 has an integral extension 109 formed therewith which has an opening leading from inside sleeve 102 to outside the sleeve to provide a drain for the condensed vapor after electrical discharge takes place. Extension 109 is positioned adjacent the end of sleeve 102 at which terminal 106 is provided.

A tube 110, made for example of alumina and having an opening 112 passing therethrough, is positioned so as to be directly aligned with the opening of terminal 104 into sleeve 102. Opening 112 has a smaller inner diameter than that of terminal 104. Opening 112 forms a restriction for bubbles formed when the liquid sample begins to vaporize and operates as the restriction provided by opening 42 tube 40 in FIG. 1, opening 41 in FIG. 3 and opening 70 in tube 68 in FIG. 4. A tube 116, made for example of alumina and having an opening 118 passing therethrough is positioned so as to be directly aligned with the opening of terminal 106 into sleeve 102. Tubes 110 and 116 are both held in position by sleeve 102. Opening 118 has a smaller inner diameter than that of terminal 106. Opening 118 provides a restriction for bubbles formed in the liquid introduced through terminal 106 and operates similarly to the restriction provided by opening 112 in tube 110. Openings 112 and 118 are directly aligned with one another and a gap 122 is provided between tubes 110 and 116.

In operation, the source 100 shown in FIG. 5 operates similarly to the embodiments in FIGS. 1, 3 and 4 and the constraints of equations (1), (2), (3), and (4) are applicable. The electrical discharge across a bubble takes place approximately in gap 122 between the two tubes 110 and 116. The liquid introduced through terminal 106 serves primarily as a coolant similarly to the coolant introduced through tube 72 in FIG. 4. With the extension 109 in the position shown the resulting spectral radiation is representative or characteristic of the liquid sample introduced through terminal 104. However, if extension 109 and its opening were positioned immediately adjacent and directly opposite gap 122 and two different liquids were introduced through terminals 104 and 106, the resulting spectral radiation might be characteristic of the mixture of the two liquids as opposed to the characteristic of only one of the liquids.

Figure 6:
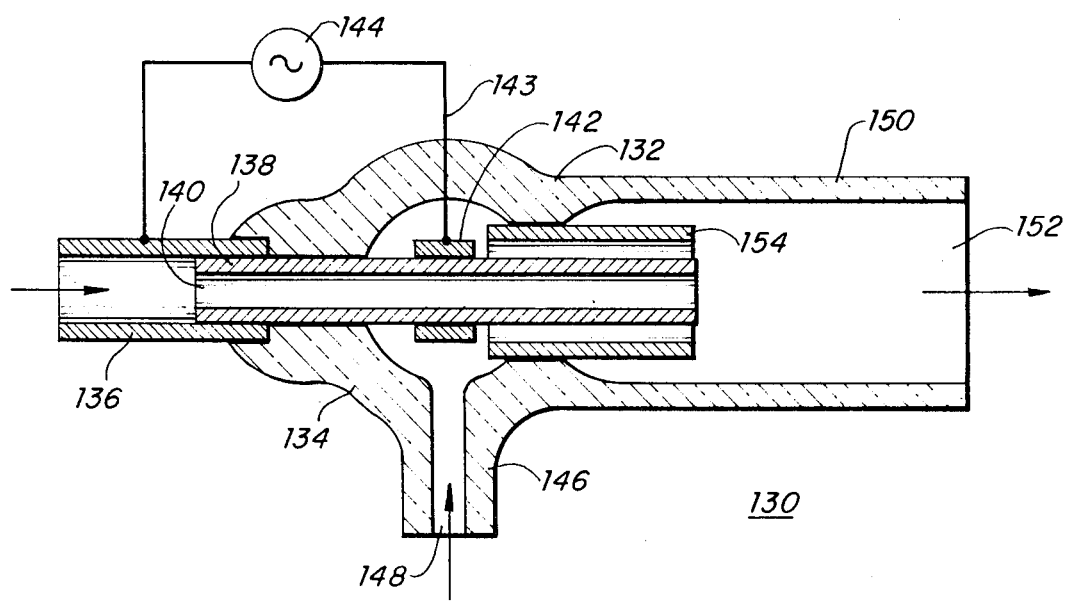
FIG. 6 shows another embodiment of the present invention.

FIG. 6 shows still another configuration of a source 130 having a glass envelope or sleeve 132 through one end 134 of which is mounted a hollow, tantalum terminal 136 through which the liquid sample is introduced. Positioned partially within terminal 136 and extending into sleeve 132 is a relatively long, hollow tube 138 made for example of alumina and having an opening 140 passing completely therethrough Opening 140 provides the necessary restriction for a bubble formed when the liquid sample begins to vaporize. A second tantalum terminal 142 is positioned inside sleeve 130 and at least partially surrounds and is concentric with but spaced from tube 138. Terminal 142 is provided with a conductive lead 143 which extends through sleeve 132. Lead 143 both supports terminal 142 in position as well as providing an electrical connection thereto. A source of high potential 144 is connected across terminal 136 and lead 143.

Sleeve 132 has an extension 146 having an opening 148 which communicates with the inside of the sleeve. Opening 148 is located immediately adjacent and directly opposite terminal 142. Opening 148 is used for introducing another flow of the liquid sample or some other liquid into sleeve 132. This additional liquid serves as a coolant and if the liquid sample introduced through terminal 136 is not used, then for example solutions of $NH_4Cl$, $NH_4OH$, HCl, or $N(CH_3)_4$ OH in water may be used. Sleeve 132 has another extension 150 having an opening 152 which serves as a drain for the condensed vapor after the electrical discharge occurs. Tube 138 extends into opening 152 of extension 150. Concentric with spaced from, and surrounding the end of tube 138 which projects into opening 152 is a second alumina tube 154.

With the liquid sample flowing through terminal 136 and a second liquid flowing through opening 148 into sleeve 132, an electrical discharge takes place across a bubble confined or restricted in tube 138 when the liquid sample begins to vaporize. The operation is similar to that which occurs in the embodiments of FIGS. 1, 3, 4 and 5 and the constraints of equations (1), (2) and (3) are all applicable. Also, the bubble so formed and restricted in opening 140 is sufficiently restricted in space such that it does not contact terminal 136 when the discharge takes place. The position of the bubble at the time of discharge in this embodiment is approximately at the end of tube 138 opposite terminal 136. Also the bubble has a tendency to overlap the end of opening 140 of tube 138 and partially fills some of the space between tube 138 and tube 154. Tube 154 is thus provided in order to confine the overlapping part of the bubble which occurs in this embodiment. In the event, however, that the liquid flow in through opening 148 is cut off, the bubble formed will be positioned in opening 140 at the end of tube 138 adjacent terminal 136 and as a result will contact terminal 136 so that the discharge takes place from one liquid surface to another liquid surface, one of the liquid surfaces of the bubble being in contact with terminal 136 at the time of discharge. This latter mode of operation is not as desirable as the former mode where the bubble does not contact either terminal during discharge.

It should be understood that in the preferred operation of any of the embodiments shown, when the discharge occurs the bubble is not in contact with either of the two terminals. However, in the event that the bubble happens to be in contact with one terminal, the discharge from one liquid surface to another liquid surface still occurs, although the results are not as good. In no event should the bubble simultaneously contact both terminals at the time of discharge of arcing between the terminals will result and there will be undesirable wear and damage to the terminals. The bubble in this invention is so confined or restricted that the electrical discharge occurs across the bubble only from one liquid surface to another.

Since certain changes may be made in the above method and apparatus without departing from the scope of the invention herein involved, it is intended that all matter contained in the above description or shown in the accompanying drawing shall be interpreted in a illustrative and not in an limiting sense.

What is claimed is:

1. A device for generating spectral radiation characteristic of a conductive liquid sample, said device comprising:
   conduit means through which said liquid sample is intended to flow;
   a pair of electrically conductive terminals positioned so as to be at least partially immersed in said liquid sample flow, said terminals being formed of material which is substantially chemically inert to the constituents of said liquid sample in ionized and un-ionized states;
   means for applying across said terminals an electrical potential in excess of the breakdown voltage of the vapor state of said liquid sample at a current level adequate to raise the temperature of said liquid sample between said terminals to a level at which said liquid sample vaporizes and forms a bubble; and
   means for restricting said bubble sufficiently in space such that said bubble does not simultaneously contact both of said terminals, whereby the potential across said bubble can cause electrical breakdown in said vapor and an electrical discharge across said bubble occurs.

2. A device as set forth in claim 1 wherein restricting means restricts said bubble in time for a sufficient time to insure that said electrical discharge occurs.

3. A device as set forth in claim 1 wherein said restricting means has an opening therein said opening being of a size such that said opening is closed by said bubble.

4. A device as set forth in claim 1 wherein said device is enclosed in a housing so that the effects of ambient conditions are substantially eliminated.

5. A device as set forth in claim 4 wherein said terminals are concentrically positioned with respect to one another within said housing.

6. A device as set forth in claim 4 wherein said terminals are mounted at opposite ends of said housing.

7. A device as set forth in claim 1 wherein said restricting means has an opening therein in which said bubble is restricted, said opening being positioned immediately adjacent and spaced from said conduit means where said liquid sample flows out of said conduit means.

8. A device as set forth in claim 1 wherein said conduit means and one of said terminals are integrally formed of a hollow, conductive member.

9. A device as set forth in claim 1 wherein said terminals are spaced and concentrically positioned with respect to one another and an insulating member is positioned between said terminals.

10. A device as set forth in claim 9 wherein said insulating member and said restricting means are integrally formed of the same material.

11. A device as set forth in claim 1 further including means for condensing said vapor state of said liquid sample after the discharge occurs.

12. A device as set forth in claim 11 wherein said condensing means includes a glass housing on which condensate forms and runs down the walls thereof.

13. A device as set forth in claim 11 wherein said condensing means includes means for introducing a coolant with which said vapor state of said liquid condenses in contact therewith.

14. A device as set forth in claim 13 wherein said restricting means includes a pair of hollow tubes, each of said tubes having an opening passing therethrough defining a restriction, one of said tubes having its opening adjacent and sufficiently spaced from said conduit means where said liquid sample flows out of said conduit means in order to prevent said bubble from contacting one of said terminals when said discharge occurs, the other of said tubes having its opening adjacent and spaced from said means for introducing said coolant, said tubes having their openings aligned with one another and being spaced from one another, said spacing between said tubes defining a gap within which said discharge occurs.

15. A device as set forth in claim 4 wherein said housing includes an opening through which condensate and products resulting from said discharge may be vented and drained from said housing.

16. A device as set forth in claim 1 wherein said terminals are made of materials which are passivated by oxide lamps.

17. A device as set forth in claim 1 wherein said terminals are made of tantalum.

18. A device as set forth in claim 1 wherein said restricting means is made of a material which is substantially translucent, relatively high temperature resistant, and chemically inert to the constituents of the liquid sample in its ionized and un-ionized states.

19. A device as set forth in claim 1 wherein said restricting means is made of alumina.

20. A device as set forth in claim 1 wherein said restricting means is made of sapphire.

21. A device as set forth in claim 1 wherein said restricting means is made of quartz.

22. A device as set forth in claim 1 wherein said restricting means restricts said bubble sufficiently in space such that the greatest cross-sectional dimension of said bubble in a line substantially perpendicular to the equipotential lines between said terminals does not equal or exceed the minimum distance between said terminals measured along the lines of electrical current flow.

23. A device as set forth in claim 1 wherein said terminals are made of chemically nonreactive materials.

24. A device as set forth in claim 1 wherein said terminals are made of ablative materials.

25. A device for generating spectral radiation characteristic of a conductive liquid sample, said device comprising:
   means for containing said liquid sample;
   a pair of hollow electrically conductive terminals, one of said terminals providing a conduit for said liquid sample into said containing means, said terminals positioned so as to be at least partially immersed in said liquid sample in said containing means said terminals being formed of material which is substantially chemically inert to the constituents of said liquid sample in ionized and un-ionized states;

means for applying across said terminals an electrical potential in excess of the breakdown voltage of the vaporous state of said liquid sample at a current level adequate to raise the temperature of said liquid sample between said terminals to a level at which said liquid sample vaporizes and forms a bubble;

means for insulating said terminals from one another;

means for restricting said bubble, said restricting means having an opening therein in which said bubble is restricted said opening being positioned immediately adjacent and spaced from the open end of said terminal through which said liquid sample flows into said containing means, said restricting means being held in position by said insulating means, said opening of said restricting means sufficiently restricting said bubble (1) in space such that said bubble does not contact either of said terminals the greatest cross-sectional dimension of said bubble in a line substantially perpendicular to the lines of equipotential force between said terminals does not equal or exceed the minimum distance between said terminals measured along the lines of electrical current flow, (2) in time, and (3) in position to close the space defined by said opening, whereby the potential across said bubble can cause electrical breakdown in said vapor and an electrical discharge across said bubble occurs.

26. A device for generating spectral radiation characteristic of a conductive liquid sample, said device comprising:

means for containing said liquid sample, said means having at least one opening therein for permitting the introduction of a conductive liquid therein;

a pair of hollow, electrically conductive terminals, one of said terminals extending into said containing means and providing a conduit for introduction of a conductive liquid into said containing means, said terminals positioned so as to be in contact with said conductive liquid when introduced into said containing means; said terminals being formed of material which is substantially chemically inert to the constituents of said liquid in ionized and un-ionized states;

means for applying across said terminals an electrical potential in excess of the breakdown voltage of the vapor state of said liquid sample at a current level adequate to raise the temperature of said liquid sample between said terminals to a level at which said liquid sample vaporizes and forms a bubble;

means for restricting said bubble, said restricting means including one hollow, nonconductive tube having an opening passing therethrough, said one tube extending at least partially into said containing means and through said other terminal, said openings of said one terminal and said one tube being aligned; and another hollow, nonconductive tube partially surrounding and spaced from said one tube at the end thereof opposite said one terminal, said restricting means restricting said bubble in said opening defined by said one tube and in said space between said tubes such that said bubble does not contact either of said terminals and in position to close said opening of said one tube, whereby the potential across said bubble can cause electrical breakdown in said vapor and an electrical discharge across said bubble occurs.

27. A method for generating spectral radiation characteristic of a liquid, said method comprising the steps of:

applying an electrical current to a body of conductive liquid, said current being at a level sufficient to raise the temperature of said liquid to cause said liquid to vaporize and form a bubble and being at a potential in excess of the breakdown voltage of the vapor state of said liquid; and restricting said bubble so that the potential across said bubble can rise until electrical breakdown and an electrical discharge only across said bubble occurs.

UNITED STATES PATENT OFFICE
CERTIFICATE OF CORRECTION

Patent No. 3,609,041              Dated   September 28, 1971

Inventor(s) Robert H. Webb and Neils O. Young

It is certified that error appears in the above-identified patent and that said Letters Patent are hereby corrected as shown below:

In the specification column 1, line 12, the phrase "including the fact" should be deleted.

Column 1, line 13, the phrase "that they destroy the sample" should be deleted;

> Column 1, line 14 the phrase -- including the fact that they destroy the sample -- should be inserted after "disadvantages";

Column 1, line 67 the term "of" (first occurrence) should read -- or -- ;

> Column 2, line 1 the term "stages" should read --stops-- ;
>
> Column 2, line 2 the term "fluorine" should read -- flowing;
>
> Column 2, line 5 the term "optics" should read -- optical detectors -- (two occurrences)
>
> Column 2, line 7 the term "optics" should read -- optical detectors -- ;

UNITED STATES PATENT OFFICE
CERTIFICATE OF CORRECTION

Patent No. 3,609,041  Dated September 28, 1971

Inventor(s) Robert H. Webb and Neils O. Young   PAGE - 2

It is certified that error appears in the above-identified patent and that said Letters Patent are hereby corrected as shown below:

Column 3, line 46 the chemical formula "$FE_2O_3$" should read -- $Fe_2O_3$;

Column 4, line 31 the term "whereby" should read -- where --

Column 4, line 46 the term "which" should be deleted;

Column 4, line 58 the term -- is -- should be inserted after "40";

Column 5, line 41 the term "on" should read -- or -- ;

Column 6, line 10 the term "100" should read -- one hundred -- ;

Column 7, line 71 the chemical formula "$N(CH_3)_4OH$" should read -- $N(CH_3)_4OH$ -- ;

Column 8, line 68 a comma (,) should be inserted after "with"

Column 9, line 38 the term "an" should read -- a -- .

Signed and sealed this 16th day of May 1972.

(SEAL)
Attest:

EDWARD M. FLETCHER, JR.
Attesting Officer

ROBERT GOTTSCHALK
Commissioner of Patents